United States Patent
Matsuura

[11] Patent Number: 5,402,445
[45] Date of Patent: Mar. 28, 1995

[54] DECISION FEEDBACK EQUALIZER

[75] Inventor: Hideki Matsuura, Tokyo, Japan

[73] Assignee: NEC Corporation, Tokyo, Japan

[21] Appl. No.: 102,258

[22] Filed: Aug. 5, 1993

[30] Foreign Application Priority Data

Aug. 6, 1992 [JP] Japan .................... 4-209868

[51] Int. Cl.⁶ ............ H03H 7/30; H03H 7/40; H03K 5/159
[52] U.S. Cl. .................... 375/229; 375/232; 364/724.16; 364/724.2
[58] Field of Search ............. 375/11, 12, 14; 333/18, 333/28 R; 364/724.16, 724.19, 724.16, 724.2

[56] References Cited

U.S. PATENT DOCUMENTS

| | | | |
|---|---|---|---|
| 3,875,515 | 4/1975 | Stuart et al. ............. | 375/14 |
| 4,583,234 | 4/1986 | Ramadan ................ | 375/11 |
| 5,031,133 | 7/1991 | Susaki .................. | 364/724.16 |
| 5,224,123 | 6/1993 | Iga et al. .............. | 375/12 |
| 5,295,157 | 3/1994 | Suzuki et al. .......... | 375/14 |

*Primary Examiner*—Stephen Chin
*Assistant Examiner*—Timothy J. May
*Attorney, Agent, or Firm*—Sughrue, Mion, Zinn, Macpeak & Seas

[57] ABSTRACT

A decision feedback equalizer capable of coping with a high transmission rate and operable at a rate which is not effected by the number of taps. A first and a second shift register are respectively connected between a first and a second adder and between the second and a third adder. The output of a decision unit associated with the last tap is delayed one bit by a third shift register and then applied to multipliers at the same time. The multipliers, each being associated with respective tap, multiply their inputs by a first to a third tap coefficient, respectively. The resulting outputs of the multipliers are applied to the associated adders. The adders each has only to perform a single addition within a period of time corresponding to one bit.

2 Claims, 2 Drawing Sheets

DECISION FEEDBACK EQUALIZER

BACKGROUND OF THE INVENTION

The present invention relates to a decision feeback equalizer (DFE) and, more particularly to a decision feedback equalizer capable of removing waveform distortions on a channel due to fading and interference from other radio communication systems automatically.

It is a common practice with a digital radio communication system to use a decision feedback equalizer for equalizing frequency selective fading. In a conventional equalizer of this type, a digital input signal come in through an input terminal is routed through a serial connection of a first to a third adder to a decision unit. The output of the decision unit is fed out as a digital output signal via an output terminal. At the same time, the digital output signal is applied to, among a first to a third shift register connected in series, the first shift register. The output of the first shift register is delivered to the second shift register and one input of a first multiplier. A first tap coefficient is fed to the other input of the first multiplier. The output of the first multiplier is fed to the third adder. The output of the second shift register is applied to a second multiplier which receives a second tap coefficient also. The output of the second multiplier is applied to the second adder. Further, the output of the third shift register is fed to a third multiplier which receives a third tap coefficient also. The output of the third multiplier is delivered to the first adder.

The problem with the conventional decision feedback equalizer is that all the adders have to be operated at the same time in order to insure equalization. Hence, when the transmission rate of digital data or the number of taps is increased, the operations of the adders cannot follow such a transmission rate or such a number of taps. Then, the equalizer is prevented from performing the expected function.

SUMMARY OF THE INVENTION

It is therefore an object of the present invention to provide a decision feedback equalizer capable of eliminating the drawback particular to the conventional equalizer as discussed above.

A decision feedback equalizer having N (natural number) taps for equalizing a digital input signal of the present invention comprises an input terminal for receiving the digital input signal, a decision unit associated with the last tap for weighting and deciding a digital output signal, N shift registers for each delaying an input signal thereof a predetermined period of time, N multipliers each receiving a particular tap coefficient at one input thereof, and N adders each having at least two inputs. The input terminal is connected to one input terminal of a first adder of the N adders. Shift registers are provided on a path between the output of the first adder and one input of the N-th adder. The output of the decision unit is routed through the N-th shift register and multipliers of the associated taps to the other inputs of the adders associated with the multipliers.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
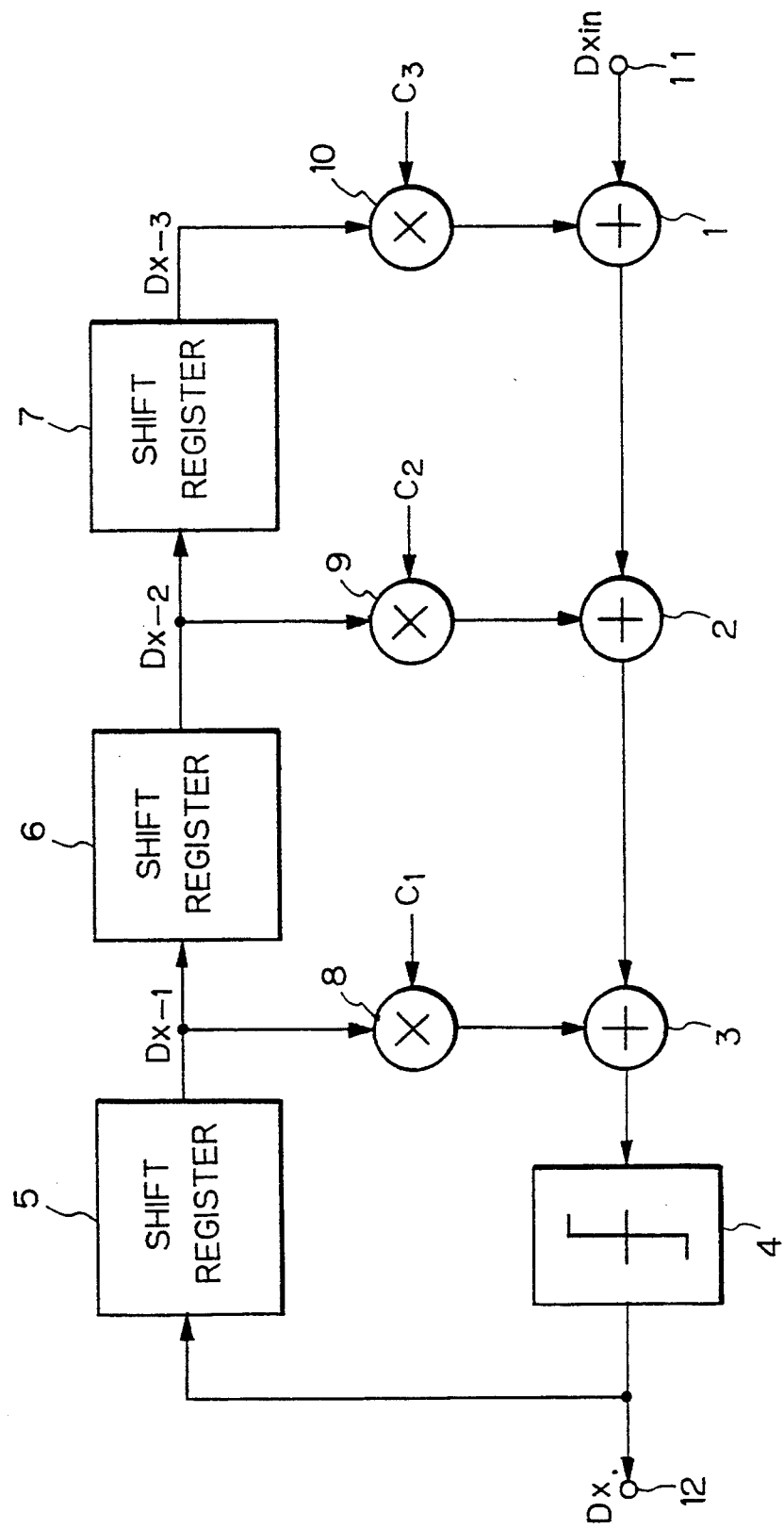
FIG. 1 is a block diagram schematically showing a conventional decision feedback equalizer.

To better understand the present invention, a brief reference will be made to a prior art decision feedback equalizer, shown in FIG. 1. As shown, the equalizer has a first to a third adder 1–3, a decision unit 4, a first to a third shift register 5–7, a first to a third multiplier 8–10, an input terminal 11, and an output terminal 12. A digital input signal Dxin comes in the equalizer via the input terminal 11, and is sequentially routed through the first to third adders 1–3 and decision unit 4 to the output terminal 12. As a result, a digital output signal Dx appears on the output terminal 12.

The digital output signal Dx is retimed, e.g., delayed by one bit by the first shift register 5. Let the resulting output of the shift register 5 be referred to as a data signal Dx-1. The data signal Dx-1 is a signal appeared one bit earlier than the digital output signal Dx and is applied to one input of the first multiplier 8 and the second shift register 6. Applied to the other input of the multiplier 8 is a tap coefficient C1. The output of the multiplier 8 is fed to the third adder 3. The data signal Dx-1 applied to the second shift register 6 is retimed, e.g., delayed by one bit. The output data signal Dx-2 of the shift register 6 is a signal appeared two bits earlier than the digital output signal Dx and is applied to one input of the second multiplier 9 and the third shift register 7. A tap coefficient C2 is applied to the other input of the multiplier 9. The output of the multiplier 9 is fed to one input of the second adder 2. The data signal Dx-2 is retimed by the shift register 7, e.g., delayed by one bit. The output data signal Dx-3 of the shift register 7 is a signal appeared three bits earlier than the digital output signal Dx and is applied to one input of the third multiplier 10. A tap coefficient C3 is applied to the other input of the multiplier 10. The output of the multiplier 10 is fed to the first adder 1.

The above-stated relation may be expressed as:

$$Dx = Dx\text{-}1 \cdot C1 + Dx\text{-}2 \cdot C2 + Dx\text{-}3 \cdot C3 + Dxin \qquad \text{Eq. (1)}$$

It is to be noted that the tap coefficients C1, C2 and C3 are used to remove waveform distortions included in the input signal Dxin.

The prerequisite with the conventional decision feedback equalizer is that all the adders 1–3 be operated at the same time in order to insure equalization, as stated earlier. Hence, when the transmission rate of digital data or the number of taps is increased, the operations of the adders 1–3 cannot follow such a transmission rate or such a number of taps. Then, the equalizer is prevented from performing the expected function.

Figure 2:
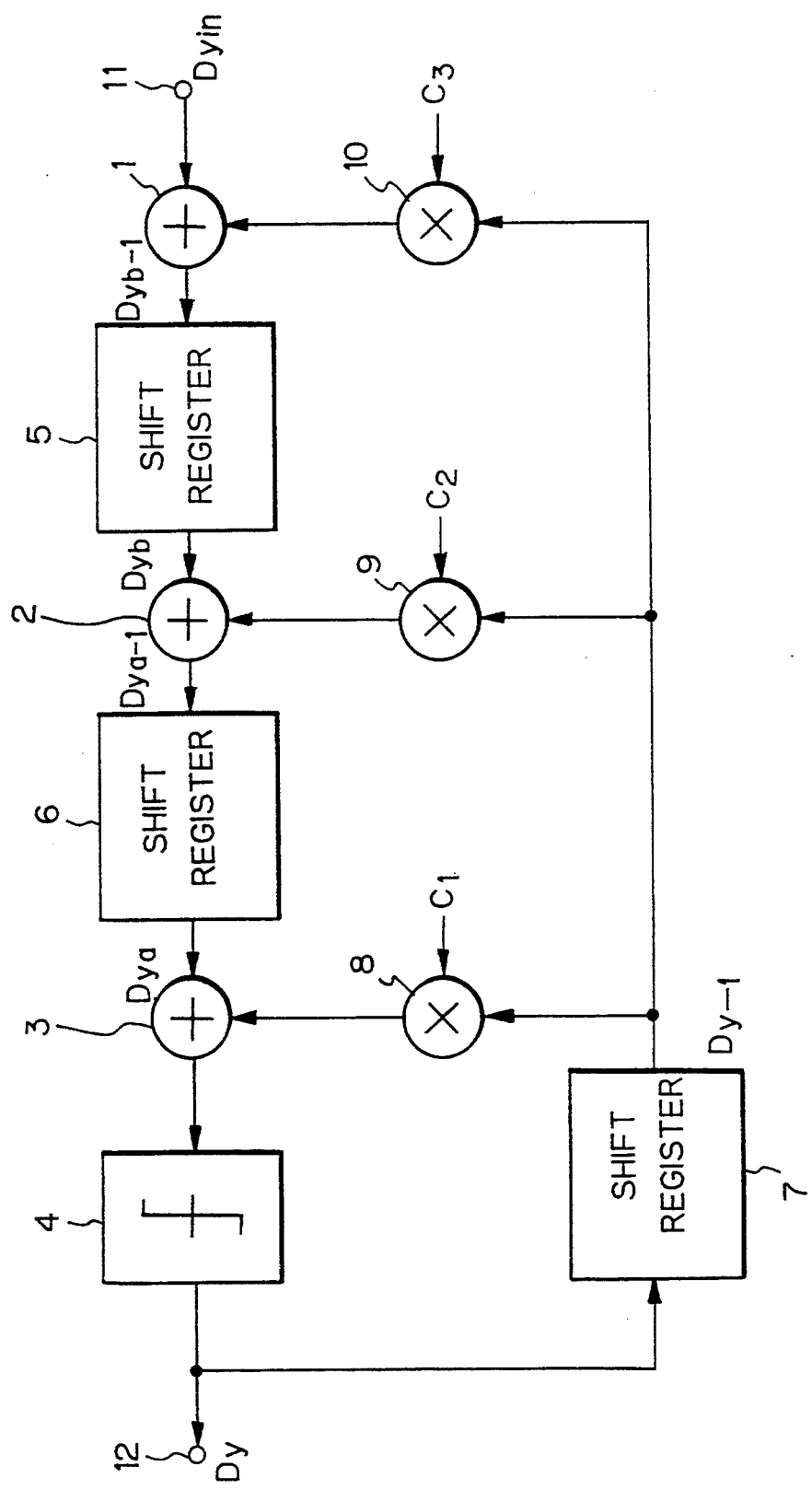
FIG. 2 is a block diagram schematically showing a decision feedback equalizer embodying the present invention.

Referring to FIG. 2, a decision feedback equalizer embodying the present invention is shown. As shown, the equalizer, like the conventional equalizer, has adders 1–3, a decision unit 4, shift registers 5–7, and multipliers 8–10. However, the circuitry of FIG. 2 differs from that of FIG. 1 in respect of connection. Specifically, the first shift register 5 is connected between the output of the first adder 1 and one input of the second adder 2. The second shift register 6 is connected be- tween the output of the second adder 2 and one input of the third adder 3. The output of the decision unit 4 is connected to an output terminal 12 and the third shift register 7. The shift register 7 delays the output signal of the decision unit 4 one bit and directly feeds the delayed signal to the first to third multipliers 8–10. Therefore, the multipliers 8–10, which respectively receive tap coefficients C1–C3, perform multiplication at the same time. The output signals of the multipliers 8–10 are each applied to the other input of the associated adder.

In the equalizer shown in FIG. 2, assume that a digital input signal Dyin arrives at the input terminal 11, that a digital output signal Dy appears on the output terminal 12, that a data signal Dyb-1 is applied from the first adder 1 to the first shift register 5, that the shift register 5 produces an output Dyb, that a data signal Dya-1 is applied from the second adder 2 to the second shift register 6, that the shift register 6 produces an output Dya, that the third shift register 7 produces an output Dy-1, that a signal Dy-2 appears one bit earlier than the signal Dy-1, a signal Dy-3 appeared two bits earlier than the signal Dy-1, and that the other inputs of the first to third multipliers 8–10 are C1, C2 and C3, respectively. Then, when the data signal Dyb-1 from the adder 1 has passed the shift register 5 to turn out Dyb, Dya-1 and Dy are expressed as:

$$Dya\text{-}1 = Dyb + Dya\text{-}2 \cdot C2 \qquad \text{Eq. (2)}$$
$$= Dyin + Dy\text{-}3 \cdot C3 + Dy\text{-}2 \cdot C2$$
$$Dy = Dya + Dy\text{-}2 \cdot C1$$

Further, when the data signal Dya-1 from the adder 2 has passed the shift register 6 to turn out Dya, Dy is represented by:

$$Dy = Dyin + Dy\text{-}3 \cdot C3 + Dy\text{-}2 \cdot C2 + Dy\text{-}1 \cdot C1 \qquad \text{Eq. (3)}$$

The Eq. (3) results in the same value as the previous Eq. (1). This means that the embodiment has the characteristic of the conventional equalizer.

Further, in the embodiment, the shift registers 5 and 6 are respectively connected between the adders 1 and 2 and between the adders 2 and 3, as stated above. Hence, the adders 1–3 have only to complete a single addition within a period of time corresponding to one bit. This allows the embodiment to cope with a higher transmission rate than the conventional equalizer. In addition, since the operation rate is not effected by the number of taps, the embodiment can accommodate a greater number of taps than conventional.

While the embodiment has been shown and described as having three taps, it is, of course, practicable with an N (natural number) tap configuration having N taps.

In summary, it will be seen that the present invention provides a decision feedback equalizer adaptive to a higher transmission rate than conventional equalizers of the type concerned. This advantage is derived from the fact that adders need only to complete a single addition within a period of time which the N-th shift register delays the output of a decision unit. In addition, since the operating speed of the equalizer is not effected by the number of taps, a greater number of taps can be arranged to enhance the performance of the equalizer.

Various modifications will become possible for those skilled in the art after receiving the teachings of the present disclosure without departing from the scope thereof.

What is claimed is:

1. A decision feedback equalizer having N taps for equalizing a digital input signal, comprising:
   an input terminal for receiving the digital input signal;
   N multipliers each having a first and a second input terminals and receiving a particular tap coefficient at said first input thereof to produce a tapped signal;
   N adders successively interconnected, each having at least two input terminals and an output terminal, one of said at least two input terminals of each of said adders receiving said tapped signal from a respective one of said N multipliers, said input terminal of the decision feedback equalizer being connected to the another input terminal of a first adder of said N adders;
   a decision unit for supplying an output signal, said decision unit having an input terminal connected to said output terminal of the N-th adder;
   a first shift register receiving said output signal from said decision unit and delaying said output signal a predetermined period of time and transmitting the delayed output signal to said second input terminal of each of said N multipliers; and,
   N-1 shift registers, each interposed between respective two of said successively interconnected adders, and each delaying a signal applied thereto by said predetermined period of time.

2. An equalizer as claimed in claim 1, wherein said predetermined period of time comprises the time to delay one bit.

* * * * *